(12) United States Patent
Williams et al.

(10) Patent No.: US 6,442,860 B1
(45) Date of Patent: Sep. 3, 2002

(54) TAPE MEASURE WITH MARKING DEVICE HOLDER

(76) Inventors: William Lee Williams, 306 Eagle Way, Elizabeth Town, KY (US) 42701; Michael D. Sullivan, 1398 Copelen Rd., White Mills, KY (US) 42788

( * ) Notice: Subject to any disclaimer, the term of this patent is extended or adjusted under 35 U.S.C. 154(b) by 0 days.

(21) Appl. No.: 09/626,827

(22) Filed: Jul. 27, 2000

(51) Int. Cl.$^7$ ................................................ B25H 7/00
(52) U.S. Cl. .............................. 33/668; 33/768; 33/770
(58) Field of Search ...................... 33/666, 668, 768, 33/770

(56) References Cited

U.S. PATENT DOCUMENTS

| | | | | |
|---|---|---|---|---|
| 3,015,889 A | * | 1/1962 | Godman | 33/666 |
| 3,131,480 A | * | 5/1964 | Quenot | 33/770 |
| 4,890,393 A | * | 1/1990 | St. Jean | 33/768 |
| 4,976,037 A | * | 12/1990 | Hines | 33/768 |
| 5,016,360 A | * | 5/1991 | Starcevich | 33/770 |
| 5,845,412 A | * | 12/1998 | Arcand | 33/770 |
| 5,992,038 A | * | 11/1999 | Harmon et al. | 33/768 |
| 6,041,513 A | * | 3/2000 | Doak | 33/668 |
| 6,101,734 A | * | 8/2000 | Ten Caat et al. | 33/770 |
| 6,115,931 A | * | 9/2000 | Arcand | 33/770 |
| 6,212,787 B1 | * | 4/2001 | Dixon | 33/770 |

* cited by examiner

*Primary Examiner*—Randy W. Gibson
(74) *Attorney, Agent, or Firm*—Joseph N. Breaux

(57) ABSTRACT

A tape measure with a marking device holder. The tape measure with the marking device holder includes a tape measure assembly and a marking device holder installed on the tip end of the tape measure. The marking device holder includes two resilient clip structures for resiliently gripping and holding the tip end of a marking device such as a pencil.

1 Claim, 1 Drawing Sheet

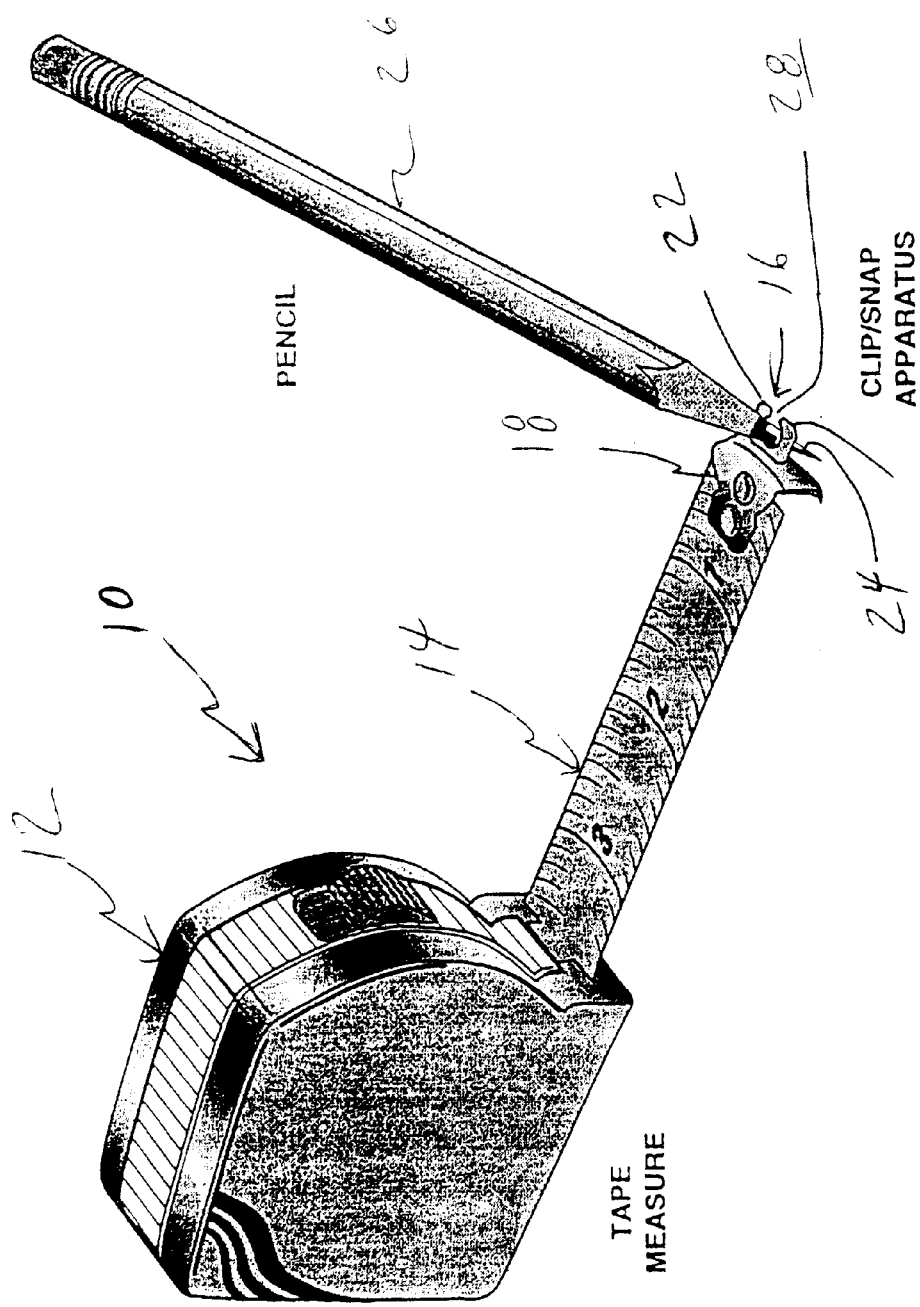

TAPE MEASURE WITH MARKING DEVICE HOLDER

TECHNICAL FIELD

The present invention relates to tape measures and more particularly to a tape measure with a marking device holder that includes a tape measure assembly and a marking device holder installed on the tip end of the tape measure; the marking device holder including two resilient clip structures for resiliently gripping and holding the tip end of a marking device such as a pencil.

BACKGROUND ART

Many times it is necessary to inscribe a mark on an object to be cut or the like at a particular distance from an edge or other landmark. This can be difficult because holding the tape measure and the marking device at the same time can be difficult. It would be a benefit, therefore, to have a tape measure that included a mechanism that could be attached to the tip of a marking device that would allow the user to hold the end of the tape measure at the required location while simultaneously making a mark on the object.

GENERAL SUMMARY DISCUSSION OF INVENTION

It is thus an object of the invention to provide a tape measure with marking device holder that includes a tape measure assembly and a marking device holder installed on the tip end of the tape measure; the marking device holder including two resilient clip structures for resiliently gripping and holding the tip end of a marking device such as a pencil.

Accordingly, a tape measure with marking device holder is provided. The tape measure with marking device holder includes a tape measure assembly and a marking device holder installed on the tip end of the tape measure; the marking device holder including two resilient clip structures for resiliently gripping and holding the tip end of a marking device such as a pencil.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 1 is a perspective view of an exemplary embodiment of the tape measure with marking device holder of the present invention showing the tape measure assembly and the marking device holder installed on the tip end of the tape measure; the marking device holder including two resilient clip structures for resiliently gripping and holding the tip end of a marking device such as a pencil.

EXEMPLARY MODE FOR CARRYING OUT THE INVENTION

FIG. 1 shows an exemplary embodiment of the tape measure with marking device holder of the present invention generally designated 10. Tape measure with marking device holder 10 includes a retractable tape measure assembly, generally designated 12, having a retractable measuring tape 14 and a marking device holder, generally designated 16, installed on the tip end 18 of retractable measuring tape 14. Marking device holder 16 includes two resilient, L-shaped, clip structures 20,22 for resiliently gripping and holding the tip end 24 of a marking device such as a pencil 26. An insertion gap 28 is provided between clip structures 20,22.

It can be seen from the preceding description that a tape measure with marking device holder has been provided.

It is noted that the embodiment of the tape measure with marking device holder described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A tape measure with marking device holder comprising:

a tape measure assembly; and a marking device holder installed on the tip end of the tape measure;

the marking device holder including two resilient clip structures for resiliently gripping and holding the tip end only of a marking device.

\* \* \* \* \*